United States Patent
Wu et al.

(10) Patent No.: US 8,164,895 B2
(45) Date of Patent: Apr. 24, 2012

(54) PORTABLE ELECTRONIC DEVICE WITH HARD DISC DRIVE PROTECTION

(75) Inventors: Wei Wu, Shenzhen (CN); Xin Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 144 days.

(21) Appl. No.: 12/791,871

(22) Filed: Jun. 2, 2010

(65) Prior Publication Data

US 2011/0063791 A1    Mar. 17, 2011

(30) Foreign Application Priority Data

Sep. 11, 2009   (CN) .......................... 2009 1 0306902

(51) Int. Cl.
*G06F 1/16*   (2006.01)
(52) U.S. Cl. ................... 361/679.35; 248/562; 360/256; 206/710
(58) Field of Classification Search ............... 248/311.2, 248/229.2, 562, 638, 615, 570, 235.4, 694, 248/188.8, 594, 600; 29/825, 760; 369/75.11, 369/263.1; 361/679.33, 679.34, 679.6, 679.31, 361/679.46, 679.39, 679.48, 679.35; 360/97.02, 360/256, 265.1, 245.4, 92.1, 244.3, 99.08, 360/235.3; 206/454, 710, 305, 589, 521.1; 340/7.32

See application file for complete search history.

(56) References Cited

U.S. PATENT DOCUMENTS

| | | | |
|---|---|---|---|
| 5,012,220 A * | 4/1991 | Miller .......................... | 340/7.32 |
| 2011/0173805 A1* | 7/2011 | Richet et al. ..................... | 29/825 |

* cited by examiner

*Primary Examiner* — Hung Duong
(74) *Attorney, Agent, or Firm* — Altis Law Group, Inc.

(57) ABSTRACT

A portable electronic device includes a main body and a first shock absorbing assembly. The main body defines a receiving space to receive a hard disc drive. The first shock absorbing assembly includes a supporting post, a connecting member, a clipping element, and at least one pressing post. The supporting post protrudes from a bottom of the receiving space. The connecting element is moveably connected to the supporting post and includes a first elastic member arranged around the connecting element. The supporting post resists one end of the first elastic member to cause the first elastic member to be compressed. The clipping element is secured to the connecting element. The clipping element clips the hard disc drive under the spring force of the first elastic member. The at least one pressing post is secured to the clipping element and presses the hard disc drive.

10 Claims, 4 Drawing Sheets

PORTABLE ELECTRONIC DEVICE WITH HARD DISC DRIVE PROTECTION

BACKGROUND

1. Technical Field

The present disclosure relates to portable electronic devices and, particularly, to a portable electronic device capable of protecting a hard disc drive therein from being damaged by impacts to the portable electronic device.

2. Description of Related Art

Hard disc drives (HDDs) are known to be very sensitive to impact. A conventional way to protect the drives is to cushion the drives against shock from impact. However, cushioning the drives cannot provide maximum protection from impact shocks.

BRIEF DESCRIPTION OF THE DRAWINGS

The components of the drawings are not necessarily drawn to scale, the emphasis instead being placed upon clearly illustrating the principles of a portable electronic device with hard disc drive protection. Moreover, in the drawings, like reference numerals designate corresponding parts throughout several views.

DETAILED DESCRIPTION

Figure 1:
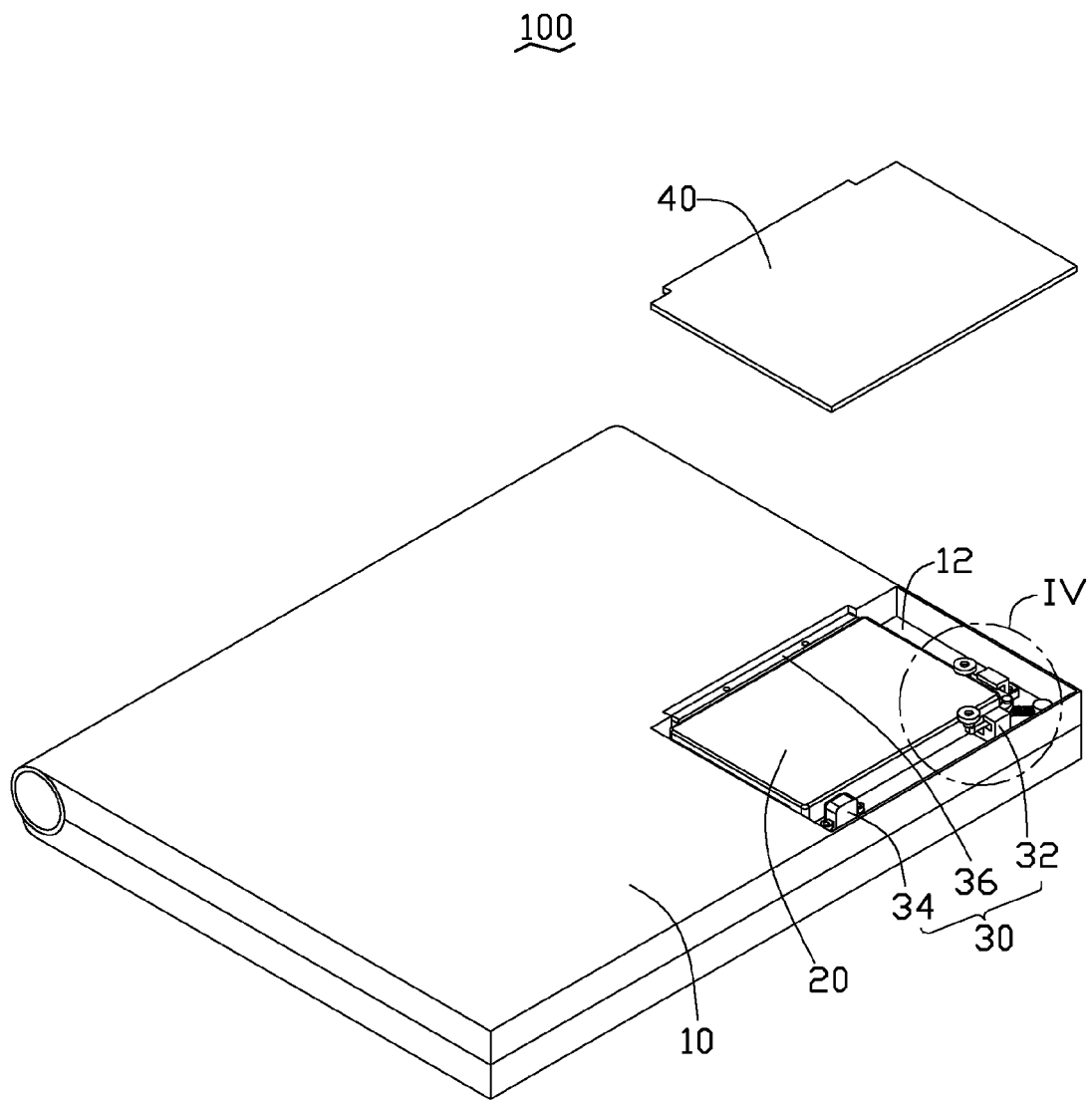
FIG. 1 is a perspective view of a portable electronic device in accordance with an exemplary embodiment, showing a hard disc drive and a shock absorbing mechanism mounted in the portable electronic device.

Referring to FIG. 1, a portable electronic device 100 includes a main body 10, a hard disc drive 20, a shock absorbing mechanism 30, and a lid 40. The main body 10 defines a receiving space 12 to receive the drive 20 and the mechanism 30. The mechanism 30 is configured to isolate the drive 20 from impacts by absorbing the shock of impacts to the device 100. The lid 40 is secured to the main body 10 to cover the receiving space 12.

Figure 2:
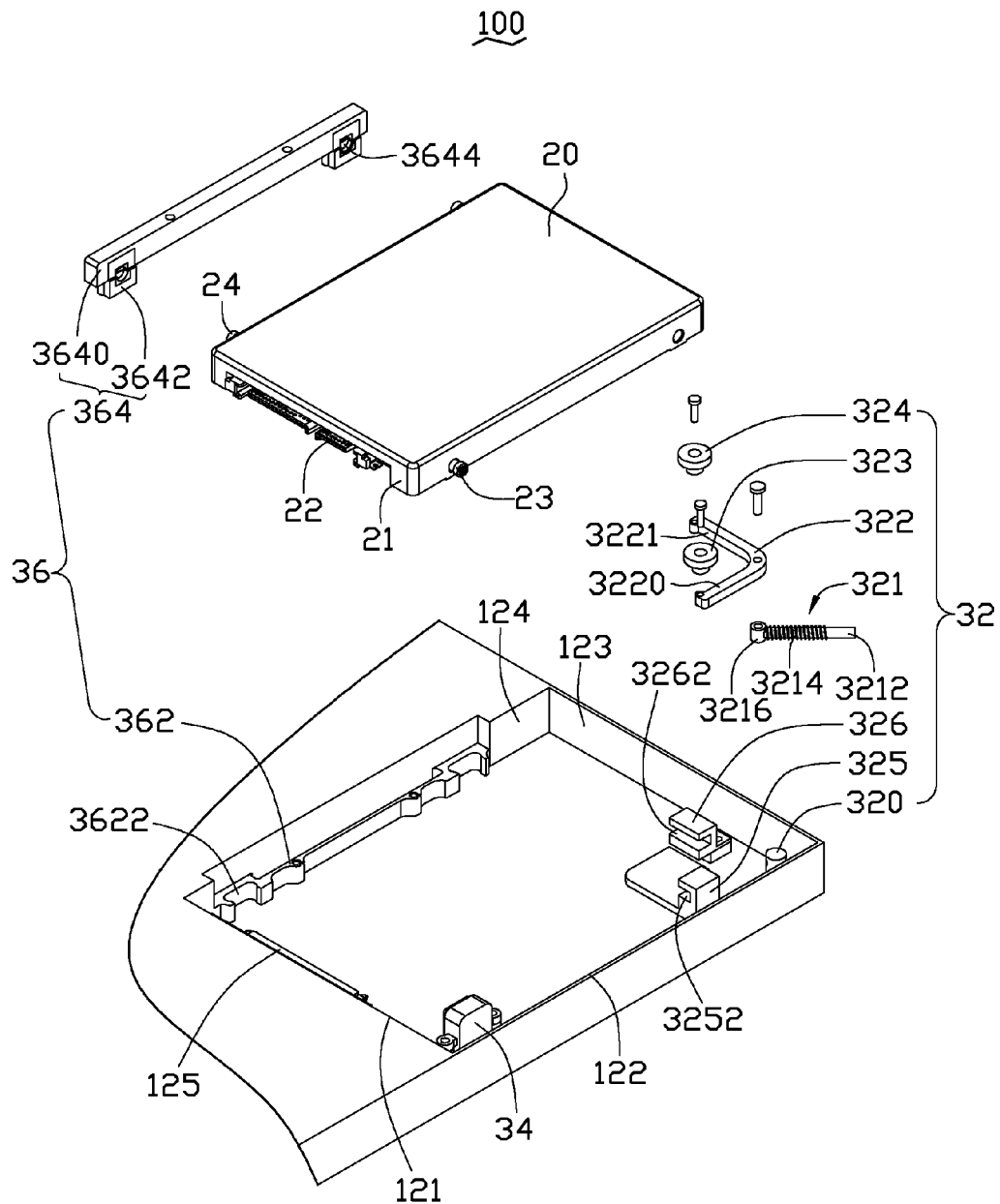
FIG. 2 is a partial, exploded, perspective view of the portable electronic device of FIG. 1.
Figure 3:
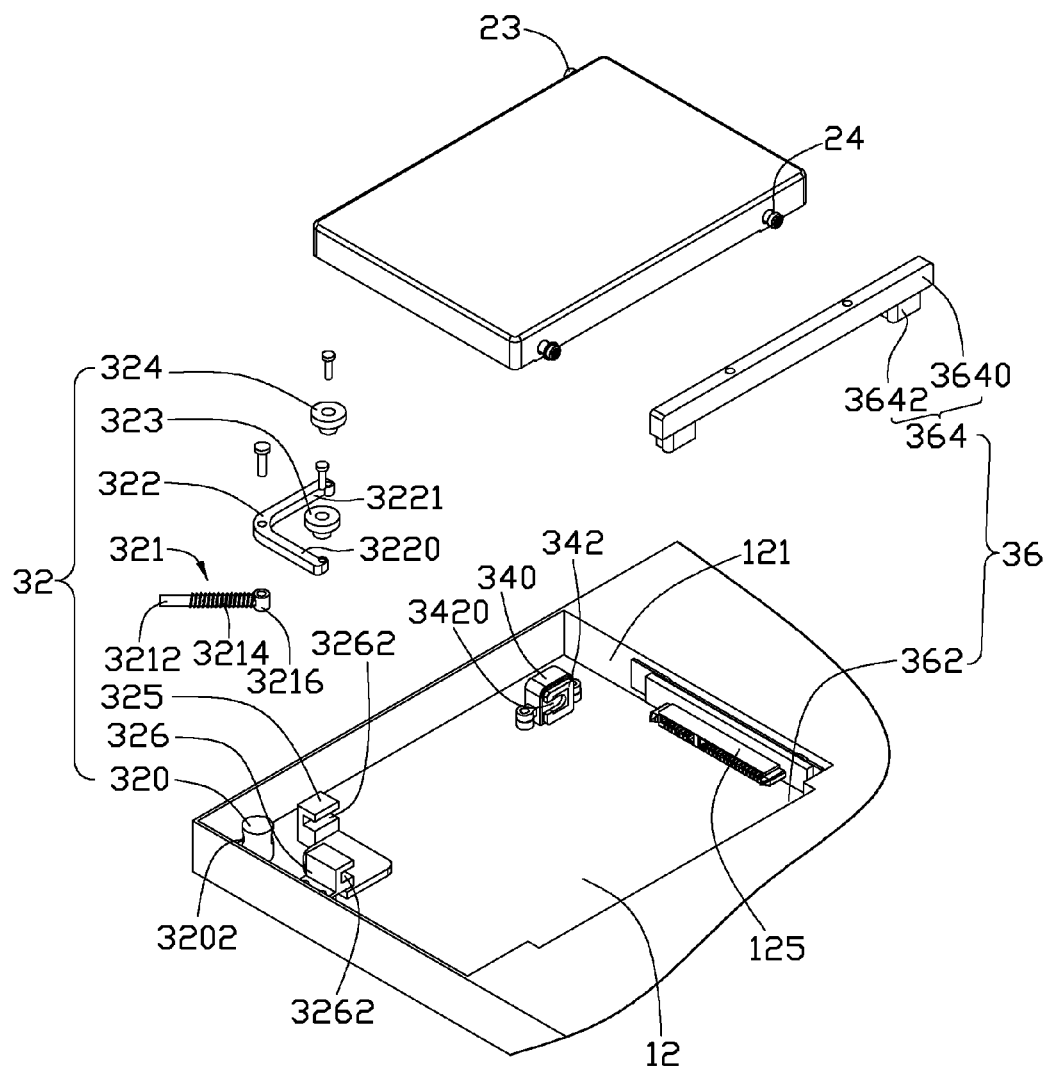
FIG. 3 is similar to FIG. 1, but viewed from another viewpoint.
Figure 4:
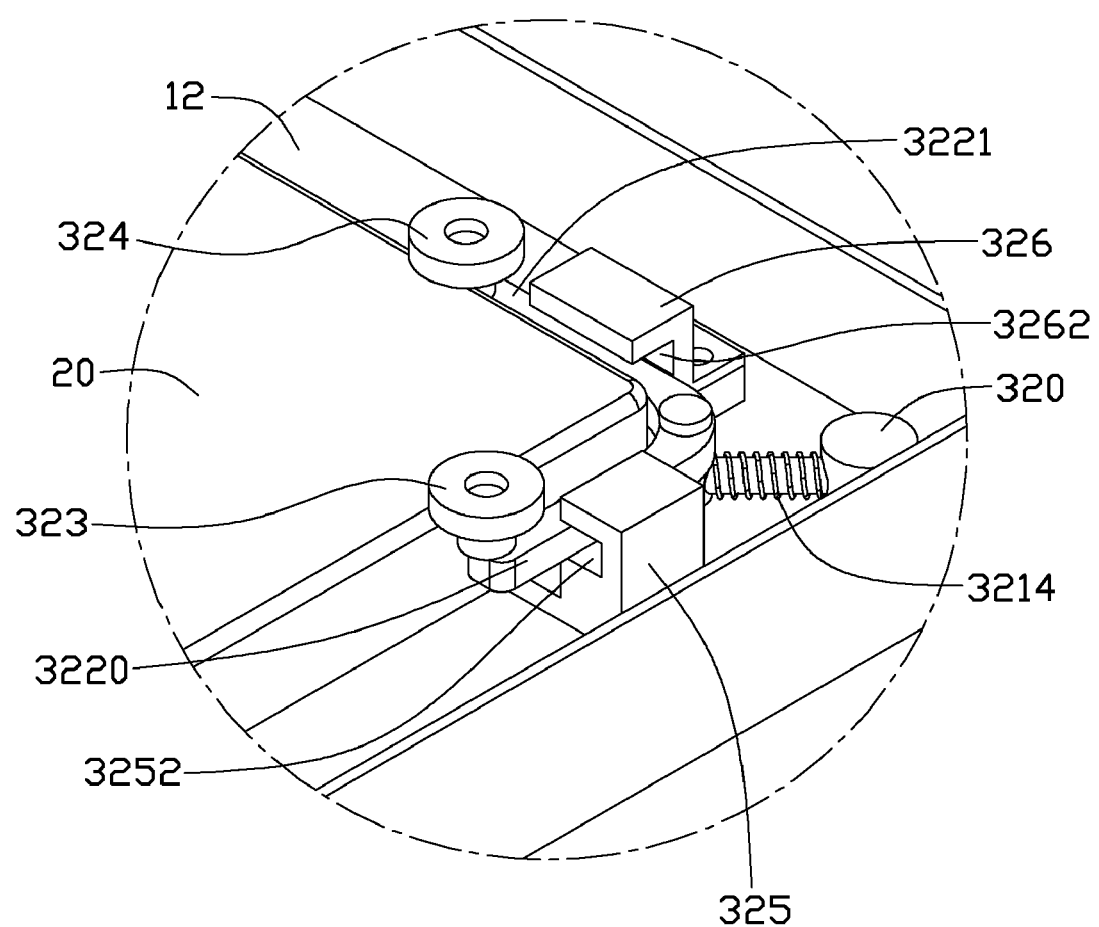
FIG. 4 is an enlarged, perspective view of circled portion IV of FIG. 1.

Referring also to FIGS. 2-4, the receiving space 12 includes a first sidewall 121, a second sidewall 122, a third sidewall 123, and a fourth sidewall 124. The first sidewall 121 is substantially parallel to the third sidewall 123. The second sidewall 122 is substantially parallel to the fourth sidewall 124 and perpendicular to the first sidewall 121 and the third sidewall 123. A first connector 125 is mounted on the first sidewall 121. The first connector 125 is electrically connected to a circuit board (not shown). A second connector 22 is mounted on a sidewall 21. The second connector 22 can be electrically connected to the first connector 125. A positioning post 23 protrudes from one sidewall (not labeled) connected to the sidewall 21 of the drive 20, and two positioning posts 24 opposite to the positioning post 23 protrude from another sidewall (not labeled) of the drive 20.

The mechanism 30 includes a first shock absorbing assembly 32, a second shock absorbing assembly 34, and a third shock absorbing assembly 36.

The assembly 32 includes a supporting post 320, a connecting element 321, a clipping element 322, a pressing post 323 and a pressing post 324, a first positioning element 325, and a second positioning element 326. The connecting element 321 is moveably connected to the supporting post 320. The clipping element 322 is secured to the connecting element 321. The pressing posts 323 and 324 are secured to the clipping element 322. The clipping element 322 is moveably received in the first positioning element 325 and the second positioning element 326.

The supporting post 320 protrudes from the bottom of the receiving space 12 and adjacent to the second sidewall 122 and the third sidewall 123. The supporting post 320 defines a through hole 3202 extending radially through the lateral surface of the supporting post 320.

The connecting element 321 includes a first rod 3212, a first elastic member 3214 arranged around the first rod 3212, and a second rod 3216 formed on one end of the first rod 3212. The diameter of the first rod 3212 is substantially equal to that of the through hole 3202. In the embodiment, the first elastic member 3214 is a coil spring shorter than the first rod 3212.

The clipping element 322 includes a first arm 3220 and a second arm 3221 substantially perpendicularly secured to the first arm 3220.

The pressing posts 323 and 324 are mounted on the first arm 3220 and the second arm 3221, respectively. The pressing posts 323 and 324 are made of elastic material. The pressing post 323 includes a smaller rod (not labeled) and a larger rod (not labeled) formed on one end of the smaller rod. The first cylinder is attached to the first arm 3220. The structure of the pressing post 324 is the same as the pressing post 323.

The first positioning element 325 is mounted on the bottom of the receiving space 12 and is adjacent to the supporting post 320 and the second sidewall 122. A first slot 3252 is formed in the first positioning element 325. The first slot 3252 extends through the first positioning element 325 and includes an opening (not shown) facing the fourth sidewall 124. The first arm 3220 can be moveably received in the first slot 3252.

The second positioning element 326 is mounted on the bottom of the receiving space 12 and is adjacent to the supporting post 320 and the third sidewall 123. A second slot 3262 is formed in the second positioning element 326. The second slot 3262 extends through the second positioning element 326 and includes an opening (not shown) facing the first sidewall 121. The second arm 3221 can be moveably received in the second slot 3262.

While assembling the assembly 32, a first step is to pass one end of the first rod 3212 opposite to the second rod 3216 through the through hole 3202 and cause the coil spring 3214 to be external to the through hole 3202. A second step is to place the first arm 3220 in the first slot 3252 and the second arm 3221 in the second slot 3262. A third step is to secure the clipping element 322 to the connecting element 321. The pressing posts 323 and 324 then can be mounted on the first arm 3220 and the second arm 3221, respectively.

The assembly 34 is mounted on the bottom of the receiving space 12 and is adjacent to the first sidewall 121 and the second sidewall 122. The assembly 34 includes a positioning block 340 and a second elastic member 342. The second elastic member 342 is mounted on the positioning block 340 and faces the fourth sidewall 124. The elastic member 342 defines a third slot 3420 with an opening (not labeled) facing the third sidewall 123. The positioning post 23 of the drive 20 can slide into the third slot 3420 via the opening of the third slot 3420.

The assembly 36 includes a supporting member 362 and a fixing member 364. The supporting member 362 protrudes from the bottom of the receiving space 12 and is adjacent to the fourth sidewall 124. A pair of recesses 3622 is formed on the supporting member 362.

The fixing member 364 includes a fixing bar 3640 and a pair of limiting blocks 3642 secured to the bottom of the fixing bar 3640. The shape of each of the limiting blocks 3642 is adapted to the recess 3622. In the embodiment, the limiting blocks 3642 are made of elastic material. A threaded hole 3644 is formed between the fixing bar 3640 and each of the limiting blocks 3642. Each of the positioning posts 24 can engage one of the threaded holes 3644.

While assembling the device 100, a tool (not shown) may be used to cause the clipping element 322 to slide toward the supporting post 320 and the coil spring 3214 to be partially compressed. The fixing member 364 is secured to the drive 20 by the engagement of the positioning posts 24 in the threaded holes 3644. The drive 20 and the fixing member 364 is placed in the receiving space 12 to cause the positioning post 23 to slide into the third slot 3420, and cause the second connector 22 to be electrically connected to the first connector 125. The tool is then removed. At this point, the coil spring 3214 rebounds to cause the clipping element 322 to clip the drive 20, and cause the pressing posts 323 and 324 to press the drive 20. It should be noted that after assembly the device 100, the coil spring 3214 remains partially compressed, thus the coil spring 3214 can absorb shock of impacts to the device 100 and protect the drive 20 from being damaged.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A portable electronic device with hard disc drive protection, comprising:
   a main body defining a receiving space to receive the hard disc drive; and
   a first shock absorbing assembly comprising:
      a supporting post protruding from a bottom of the receiving space;
      a connecting element moveably connected to the supporting post and comprising a first elastic member arranged around the connecting element, wherein the supporting post resists one end of the first elastic member to cause the first elastic member to be partially compressed;
      a clipping element secured to the connecting element, wherein the clipping element clips the hard disc drive at one corner under the spring force of the first elastic member; and
      at least one pressing post secured to the clipping element and pressing the hard disc drive.

2. The device as described in claim 1, wherein the first shock absorbing assembly further comprises a first positioning element and a second positioning element mounted on the bottom of the receiving space, the first positioning element defines a first slot, and the second positioning element defines a second slot, the clipping element is moveably received in the first slot and the second slot.

3. The device as described in claim 2, wherein the clipping element comprises a first arm and a second arm substantially perpendicularly secured to the first arm, the first arm is moveably received in the first slot, and the second arm is moveably received in the second slot.

4. The device as describe in claim 1, wherein the first elastic member is a coil spring.

5. The device as described in claim 4, wherein the connecting element comprises a rod moveably connected to the supporting post, the first elastic member is arranged around the rod, and the length of the first elastic member is less than that of the rod.

6. The device as described in claim 1, wherein the at least one pressing post is made of elastic material.

7. The device as described in claim 1 further comprising a second shock absorbing assembly mounted on the bottom of the receiving space, wherein the second shock absorbing assembly comprises a fixing block and a second elastic member mounted on the fixing block, the second elastic member defines a third slot, the hard disc drive comprises a first positioning post, the first positioning post is moveably received in the third slot.

8. The device as described in claim 1 further comprising a third shock absorbing assembly comprising a supporting member and a fixing member, wherein the supporting member protrudes from the bottom of the receiving space, the fixing member is mounted on the supporting member and defines at least one threaded hole, the hard disc drive comprises at least one second positioning post, the at least one second positioning post engages the at least one threaded hole to secure the fixing member to the hard disc drive.

9. The device as described in claim 8, wherein at least one recess is formed in the supporting member, the fixing member comprises at least one limiting block received in the at least one recess, and the at least one limiting block is made of elastic material.

10. A portable electronic device with hard disc drive protection, comprising:
   a main body defining a receiving space to receive the hard disc drive;
   a first shock absorbing assembly comprising:
      a supporting post protruding from a bottom of the receiving space;
      a connecting element moveably connected to the supporting post and comprising a first elastic member arranged around the connecting element, wherein the supporting post resists one end of the first elastic member to cause the first elastic member to be partially compressed;
      a clipping element secured to the connecting element, wherein the clipping element clips the hard disc drive at one corner under the spring force of the first elastic member; and
      at least one pressing post secured to the clipping element and pressing the hard disc drive;
   a second shock absorbing assembly mounted on the bottom of the receiving space, wherein the second shock absorbing assembly comprises a fixing block and a second elastic member mounted on the fixing block, the second elastic member defines a slot, the hard disc drive comprises a first positioning post, the first positioning post is moveably received in the slot; and
   a third shock absorbing assembly positioned on the opposite side of the hard disc drive from the second shock absorbing assembly, and comprising a supporting member and a fixing member, wherein the supporting member protrudes from the bottom of the receiving space, the fixing member is mounted on the supporting member and defines at least one threaded hole, the hard disc drive comprises at least one second positioning post, the at least one second positioning post engages the at least one threaded hole to secure the fixing member to the hard disc drive.

* * * * *